United States Patent [19]

Hawley

[11] Patent Number: 4,477,588

[45] Date of Patent: Oct. 16, 1984

[54] POLYOLEFIN POLYMERIZATION PROCESS AND CATALYST

[75] Inventor: Gil R. Hawley, Bartlesville, Okla.

[73] Assignee: Phillips Petroleum Company, Bartlesville, Okla.

[21] Appl. No.: 449,933

[22] Filed: Dec. 15, 1982

[51] Int. Cl.$^3$ ................................................ C08F 4/64
[52] U.S. Cl. .................................... 502/119; 526/119; 526/125
[58] Field of Search ....................... 252/429 B, 429 C; 502/119

[56] References Cited

U.S. PATENT DOCUMENTS

| | | | |
|---|---|---|---|
| 3,549,717 | 12/1970 | Itakura et al. | 252/429 B X |
| 4,218,339 | 8/1980 | Zucchini et al. | 252/429 B |
| 4,250,287 | 2/1981 | Matlack | 252/429 B X |
| 4,394,291 | 7/1983 | Hawley | 252/429 B |

Primary Examiner—Patrick Garvin
Attorney, Agent, or Firm—Edward L. Bowman

[57] ABSTRACT

A catalyst and process for polymerizing olefins wherein the catalyst comprises a titanium-containing component prepared by reacting a magnesium dihalide, 4-phenyl phenol, ethyl benzoate, and titanium tetrabutoxide, and an organoaluminum halide and then reacting that product with a mixture of $TiCl_4$, $HSiCl_3$, and $SiCl_4$.

11 Claims, No Drawings

POLYOLEFIN POLYMERIZATION PROCESS AND CATALYST

The present invention relates to the polymerization of olefins. In another aspect, this invention relates to novel catalysts useful for the polymerization of olefins.

In his earlier filed U.S. application Ser. No. 240,533, filed Mar. 4, 1981 and now U.S. Pat. No. 4,394,291, the present applicant disclosed a number of new high activity olefin polymerization catalysts. One of the preferred catalysts, especially for the polymerization of propylene, was prepared by reacting (a) a magnesium dihalide, (b) 4-phenyl phenol, (c) ethyl benzoate, and (d) titanium tetra-n-butoxide to produce a first catalyst component, then reacting that component with ethylaluminum sesquichloride and then reacting the resulting solid product with an equimolar mixture of titanium tetrachloride and trichlorosilane. When that catalyst was employed in the polymerization of propylene using a cocatalyst system comprising triethylaluminum, an aromatic ester, and diethylaluminum chloride productivities in the range of 15 to 25 kg of polymer per gram of catalyst were obtained. In addition, the polymer obtained with such catalysts were very low in solubles.

Those highly active catalysts were, however, prepared in small lab scale quantities typically of about 5 grams. When attempts were made to prepare the same catalysts in a 5 fold scale up, the productivities were significantly reduced and the solubles significantly increased.

An object of the present invention is to provide a similar catalyst that can be prepared on a larger scale and still give extremely high productivity and low solubles.

SUMMARY OF THE INVENTION

In accordance with the present invention, a catalyst is provided which comprises the product resulting when reactants comprising:
(a) magnesium dihalide,
(b) 4-phenyl phenol,
(c) ethyl benzoate, and
(d) titanium tetra-n-butoxide are (1) reacted to form a first catalyst component and said first catalyst component is (2) reacted with an organoaluminum halide comprising ethylaluminum sesquichloride and then the solid product of that reaction is (3) reacted with a mixture of halogen-containing compounds comprising titanium tetrachloride, trichlorosilane, and silicon tetrachloride. The sum of the volumes of $HSiCl_3$ and $SiCl_4$ employed is about equal to the volume of $TiCl_4$ in the mixture.

In another aspect, the present invention provides for the polymerization of olefins using the above-described catalyst.

DETAILED DESCRIPTION OF THE INVENTION

The presently preferred magnesium dihalide is magnesium dichloride. The present applicant in conjunction with another has recently discovered that the best productivities are obtained if a $MgCl_2$ is employed having a molar ratio of $H_2O$ to $MgCl_2$ of more than 1/1 and less than 1.5/1. Accordingly, while one can employ a wide range of magnesium chlorides, including those materials which are sold commercially as "anhydrous" magnesium dichloride, which generally have no more than about 1 mole of water per mole of magnesium dichloride, better results are obtained if the $MgCl_2$ has slightly more than 1 mole of water per mole of $MgCl_2$.

The molar ratio of the titanium alkoxide to the magnesium dihalide can be selected over a relatively broad range. Generally the molar ratio of the titanium compound to the magnesium compound is in the range of about 10/1 to 1/10, more preferably about 2/1 to about 1/2.

The metal halide compound and the transition metal compound employed in the present invention are normally mixed together by heating, e.g. refluxing, in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents, particularly at low temperatures. Such mixing temperatures are generally within the range of from about 0° C. to about 50° C. and preferably from about 10° C. to about 30° C. Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed could be higher if the pressure employed is above atmospheric pressure. The pressure employed during the heating step does not appear to be a significant parameter.

The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. Most preferably ½ mole of ethyl benzoate is employed per mole of titanium alkoxide.

Generally, the time required for heating the reactants to make the first catalyst component is within the range of about 5 minutes to about 10 hours, although in most instances a time within the range of about 15 minutes to 3 hours is sufficient.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

Generally the reaction of the product from step (2) with the halide ion exchanging source can be carried out neat or in a liquid medium in which the halide ion exchanging source is soluble. Accordingly, the product from step (2) is generally in a liquid diluent when contacted with the halide ion exchanging source. Any suitable diluent can be employed. Examples include normally liquid hydrocarbon such as n-pentane, n-heptane, cyclohexane, benzene, and xylene.

The temperature employed in step (3) can be selected over a relatively broad range, generally in the range of $-25°$ C. to $+250°$ C., preferably $0°$ C. to $200°$ C., with temperatures of $100°$ C. being most preferred.

The treating time can also be selected over a broad range and generally is within the range of about 10 minutes to about 10 hours. While the weight ratio of the halide ion exchanging source to the product of step (2) can be selected over a relatively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously disclosed, n-hexane, or xylene for example. The resulting catalyst, after drying, is stored under dry nitrogen.

As mentioned above, the sum of the volumes of $HSiCl_3$ and $SiCl_4$ is about equal to the volume of the $TiCl_4$. The relative amounts of the three specified halogen-containing compounds also has some effect upon the selectivity and productivity of the catalyst. The selectivity to crystalline polymer is best when the volume of $SiCl_4$ exceeds or is at least equal to the volume of $HSiCl_3$. The productivity on the other hand is best when the volume of $HSiCl_3$ exceeds that of the $SiCl_4$. The currently favored volume ratio for $HSiCl_3$ to $SiCl_4$ is about 3/1.

The catalyst of the present invention can be used in the polymerization of olefins. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Group IA, II, and IIIA of the Periodic Table. Of the organometallic cocatalysts, organoaluminum compounds such as those described above as suitable for use as the second component of the catalyst, are preferred with the most preferred organoaluminum cocatalysts being compounds of the formula $R_3Al$ which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5–3 and preferably about 2:1:2 is employed in bench scale testing for batch polymerization. For a continuous, larger scale process, it becomes possible, for example, when using TEA and MPT to use TEA:MPT mole ratios of about 3:1 to about 5:1 and dispense with the DEAC entirely. A decreased DEAC level is desirable when employing a flash process to recover polymer since the amount of chloride remaining in the polymer is dependent to some extent on the DEAC level.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPA to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples illustrating a few embodiments of the invention.

EXAMPLE I

Catalyst of Earlier Application

This example reports the results obtained when an attempt was made to prepare larger batches of one of the preferred catalysts of the inventor's earlier application. The catalyst was prepared under an argon atmosphere in a dry box. The technique involved mixing 38.5 grams of titanium tetra-n-butoxide, 19.05 grams of a commercially available variety of "anhydrous" magnesium chloride, 7.5 grams of ethyl benzoate, 17 grams of 4-phenyl phenol, and 125 milliters of xylene. The mixture was stirred at 100° C. for 1 hour. The resulting mixture was then cooled to normal room temperature and stirred while 125 mL of a 25 weight percent heptane solution of ethylaluminum sesquichloride (EASC) was added dropwise. The resulting mixture of solids and liquids was then diluted with xylene. The resulting mixture was then centrifuged, the liquid discarded, and the solid recovered. The solid was then washed with n-hexane until the supernatant liquid was substantially clear.

After drying, the thus obtained solid was slurried in 125 milliters of an equimolar mixture of $TiCl_4$ (100 mL) and $HSiCl_3$ (92 mL) and heated for 1 hour at 100° C. with stirring. The solid was then isolated by vacuum filtration, washed with hexane as before, and dried by being left standing in a glove box.

Five more batches of catalyst were prepared in the same manner. Each of the six resulting catalysts were then employed in the polymerization of propylene. Each polymerization employed a cocatalyst comprising 2.0 mmoles/l of triethylaluminum, 1.0 mmole/l of ethyl anisate, and 2.0 mmoles/l of diethylaluminum chloride. The triethylaluminum and the ethyl anisate were mixed, then the catalyst was added, and then the DEAC was added. The polymerizations were carried out at 70° C. for 1 hour in liquid propylene under 10 psi hydrogen.

The six catalysts gave productivities in the range of only about 3 to about 6 kg of polymer per gram of catalyst per hour. In addition, the propylene solubles, xylene solubles, and melt flow data indicated that the amount of soluble polymer formed was well over twice that produced when using catalysts of the same type prepared on a 5 gram scale. Obviously, these scaled-up catalysts were not as desirable for commercial use as those prepared on a small scale.

EXAMPLE II

Several modifications of the catalyst of Example I were prepared.

Catalyst A was prepared in the same manner as the catalyst of Example I using the same amounts of reactants except that the amount of 4-phenyl phenol was doubled to 34 grams (2 mmoles) and 150 mL of the 25 weight percent heptane solution of EASC was employed rather than 125 mL. Seven grams of the solid resulting after the EASC reaction was slurried in 30 milliters of an equimolar mixture of $TiCl_4$ and $HSiCl_3$ and heated with stirring for 1 hour at 100° C. The catalyst was washed and recovered as in Example I.

Catalyst B was prepared the same as Catalyst A except that 6 grams of the solid resulting after the EASC reaction was slurried in a mixture of 20 mL of $TiCl_4$, 15 mL of $HSiCl_3$, and 5 mL of $SiCl_4$ rather than $TiCl_4$ and $HSiCl_3$. The molar ratio of $HSiCl_3$ to $TiCl_4$ was 0.75/1 and of $SiCl_4$ to $TiCl_4$ was 0.25/1.

Catalyst C was prepared in exactly the same manner as Catalyst B.

Catalyst D was prepared in the same manner as Catalyst B except that its prep employed a mixture of 20 mL of $TiCl_4$, 10 mL of $SiCl_4$, and 10 mL of $HSiCl_3$.

Catalyst E was prepared in the same manner as Catalyst B except that its prep employed a mixture of 20 mL of $TiCl_4$, 5 mL of $HSiCl_3$, and 15 mL of $SiCl_4$.

Catalyst F was prepared in the same manner as Catalyst B except that its prep employed a mixture of 20 mL $TiCl_4$, 2 mL $HSiCl_3$, and 18 mL $SiCl_4$.

These six catalysts were employed in the polymerization of propylene using a cocatalyst comprising 2.0 mmoles/l of triethylaluminum, 1.0 mmole/l of ethyl anisate, and 2.0 mmoles/l of diethylaluminum chloride. (The term mmoles/l as used herein refers to the mmoles per liter of the filled reactor). The polymerization were carried out at 70° C. for 1 hour in liquid propylene under 10 psi hydrogen. The results obtained with those catalysts are summarized in the following table.

TABLE I

| Catalyst | Volume Ratio | | | Catalyst Mg | Polymer (g) | Prod. (kg/g/hr) | % Solubles | | | Melt Flow (280° C.) | Flex. Mod. (MPa) |
|---|---|---|---|---|---|---|---|---|---|---|---|
| | $TiCl_4$ | $SiCl_4$ | $HSiCl_3$ | | | | $C_3=$ | Xylene | Total | | |
| A | 1.0 | 0 | 1.0 | 18.0 | 204 | 11.3 | 1.9 | 5.0 | 6.9 | 7.0 | 1463 |
| B | 1.0 | .25 | .75 | 19.4 | 183 | 9.44 | 3.7 | 3.1 | 6.8 | 10.9 | 1601 |
| C | 1.0 | .25 | .75 | 4.8 | 52 | 10.8 | 1.1 | 1.3 | 2.4 | 10.1 | 1601 |
| D | 1.0 | .50 | .50 | 7.8 | 61.5 | 7.88 | 0.8 | 2.8 | 3.6 | 12.1 | 1677 |
| E | 1.0 | .75 | .25 | 10.0 | 51.4 | 5.14 | 1.9 | 2.8 | 4.7 | 11.6 | 1659 |
| F | 1.0 | .90 | .10 | 7.8 | 51.4 | 6.59 | 2.5 | 2.6 | 5.1 | 15.8 | 1685 |

The data show that the productivity and solubles level for Catalyst A was somewhat better than that of the catalysts of Example I which used 1 mmole less of 4-phenyl phenol. More importantly the data show that inventive catalysts B-F provide an even much better improvement in the degree of solubles. In terms of giving the best balance between productivity and solubles, Catalysts B-F would be preferred over Catalyst A. It should be noted that the $C_3=$ solubles test tends to be unreliable thus one needs to view the total solubles value in conjunction with the melt flow and modulus values in order to get the most accurate estimate of the amount of solubles present in the polymer. Higher melt flow and modulus values indicate lower solubles. Thus, lower solubles were obtained with inventive Catalysts D-F than for inventive Catalysts B and C; however, the difference was not too great and therefore Catalysts B and C are preferred in view of the fact that they have much higher productivity than Catalysts D-F.

EXAMPLE III

Another series of polymerizations were conducted using Catalyst C with a slightly different cocatalyst system. Polymerization Runs 1-3 employed 2.0 mmoles/l of TEA, 1 mmole/l of methyl p-toluate (MPT), and 2 mmole/l of DEAC. The cocatalyst in polymerization run 4 differed in that it contained only 1.5 mmole/l of DEAC. The catalyst systems of Runs 1, 2, and 4 were prepared by premixing the TEA and MPT, then adding the catalyst, and then adding the DEAC. The catalyst system of Run 3 was prepared by premixing the DEAC and the MPT, then adding the catalyst and then adding the TEA. The polymerizations were carried out at about 70° C. The $H_2$ pressure for Runs 1 and 2 was 20 psi and for Runs 3 and 4 about 40 psi. The results are summarized in Table II.

TABLE II

| Run No. | Productivity (kg/g/hr) | Reaction Time, Hr. | % Solubles | | | Flex. Modulus (MPa) |
|---|---|---|---|---|---|---|
| | | | $C_3=$ | Xylene | Total | |
| 1 | 9.7 | 1.0 | 1.1 | 2.4 | 3.5 | 1550 |
| 2 | 10.5 | 1.0 | * | 3.1 | 3.1 | 1376 |
| 3 | 13.4 | 1.8 | * | 3.2 | 3.2 | 1521 |
| 4 | 14.8 | 1.8 | * | 4.8 | 4.8 | 1460 |

*$C_3=$ soluble left on the polymer.

When these results are compared to those in Table I, it will be seen that the cocatalyst containing MPT produces a slightly better overall balance between productivity and solubles than the cocatalyst used in Example II. This demonstrates that the DEAC level can be varied as needed to obtain the preferred combination of results, i.e., productivity, solubles, and polymer chlorine content.

EXAMPLE IV

Another catalyst was prepared using the same relative amounts of reactants as employed in Catalysts B and C of Example II, except that the level of 4-phenyl phenol was decreased to 1.5 moles per mole of butyl titanate. The catalyst was used to polymerize propylene at 70° C. under 10 psi $H_2$ using cocatalysts and reaction times as summarized in Table III.

TABLE III

| Run No. | Molar Ratio | | | Productivity (kg/g/hr) | Reaction Hrs. | % Solubles | | | Modulus (MPa) |
|---|---|---|---|---|---|---|---|---|---|
| | TEA | MPT | DEAC | | | $C_3=$ | Xylene | Total | |
| 5 | 2 | 1 | 2 | 8.13 | 1.0 | * | 3.6 | — | 1388 |
| 6 | 2 | 1 | 2 | 13.1 | 1.8 | * | 3.3 | — | 1384 |
| 7 | 4 | 1 | — | 11.8 | 2.7 | 1.2 | 5.2 | 6.4 | 1161 |
| 8 | 4 | 1 | — | 12.8 | 0.6 | * | 5.9 | — | 1141 |
| 9 | 3 | 1 | — | 10.5 | 1.0 | 6.0 | 3.9 | 9.9 | 1351 |
| 10 | 3 | 1 | — | 10.9 | 1.0 | * | 5.2 | — | 1253 |

*Propylene solubles not removed separately, therefore xylene solubles are total solubles.

A comparison of Runs 5 and 6 of this Table with Runs 2 and 3 of Table II shows that this catalyst when used with 2 TEA/1 MPT/2 DEAC provides results similar to those obtained with Catalyst C. Runs 7–10 indicate that DEAC can be removed in which case best balance of results are obtained if the TEA-MPT ratio is about 3/1.

The foregoing examples have been provided solely for the purpose of illustrating embodiments of the invention. Clearly, there are many other embodiments which equitably fall within the scope of the present invention.

What is claimed is:

1. A catalyst for the polymerization of olefins comprising the product resulting when reactants comprising
   (a) a magnesium dihalide,
   (b) 4-phenyl phenol,
   (c) ethyl benzoate, and
   (d) titanium tetra-n-butoxide are reacted to form a first catalyst component and said first catalyst component is reacted with an organoaluminum halide comprising ethylaluminum sesquichloride and then the solid product of that reaction is reacted with a mixture of halogen containing compounds comprising $TiCl_4$, $HSiCl_3$, and $SiCl_4$, wherein the sum of the volumes of $HSiCl_3$ and $SiCl_4$ in the mixture is about equal to volume of $TiCl_4$ in the mixture.

2. A catalyst according to claim 1 wherein said magnesium dihalide comprises magnesium dichloride.

3. A catalyst according to claim 2 wherein the sum of the moles of 4-phenyl phenol and the ethyl benzoate employed in the reaction is such that the ratio of said sum to the moles of titanium tetra-n-butoxide is in the range of 5/1 to 1/5.

4. A catalyst according to claim 3 wherein the molar ratio of the ethyl benzoate to the titanium tetra-n-butoxide is about 1/2.

5. A catalyst according to claim 4 wherein the volume ratio of $HSiCl_3$ to $SiCl_4$ is about 3/1.

6. A catalyst according to claim 5 wherein the mole ratio of 4-phenyl phenol to titanium tetra-n-butyloxide is in the range of 2/1 to 1/1.

7. A catalyst according to claim 6 further comprising a cocatalyst comprising triethylaluminum and an ester selected from ethyl anisate and methyl para toluate.

8. A catalyst according to claim 7 wherein said cocatalyst comprises triethylaluminum, ethyl anisate, and diethylaluminum chloride present in the molar ratio of 2:1:2.

9. A catalyst according to claim 7 wherein said cocatalyst comprises triethylaluminum and methyl para-toluate.

10. A catalyst according to claim 9 wherein said cocatalyst further comprises diethylaluminum chloride.

11. A catalyst according to claim 6 further comprising a cocatalyst consisting essentially of triethylaluminum and methyl para toluate wherein the molar ratio of the former to the latter is about 3/1.

* * * * *